Patented Oct. 13, 1942

2,298,549

UNITED STATES PATENT OFFICE 2,298,549

TREATING ZEIN

Roy E. Coleman, Chicago, Ill., assignor, by mesne assignments, to Time, Incorporated, a corporation of New York No Drawing. Application February 20, 1939, Serial No. 257,476

8 Claims. (Cl. 106—153)

This invention relates to a compounded and modified zein base adapted for use in the preparation of substantially non-aqueous, non-separating and non-gelling solutions or coating compositions and to methods of compounding the same.

In accordance with the present invention, I have found that by admixing zein with an acid, or reactive salt of the character hereinafter referred to or, preferably, a mixture thereof, I can prepare a compounded zein base which may be dissolved in suitable anhydrous or substantially non-aqueous zein solvents (preferably alcoholic solvents) to form a substantially non-aqueous solution of zein which is stable against separation of the zein and which is substantially non-gelling.

In carrying out the present invention, zein is mixed with an acid or reactive salt or mixture thereof until the mixture is substantially uniform. The mixing may be carried out in any suitable device such as, for example, a container provided with a mixing apparatus, mixing drum or the like or by a spraying process where the nature of the ingredients permit. If desired, the mixing may be carried out in the presence of water in an amount insufficient to substantially wet the zein. A compounded zein mixture embodying my invention is dry or substantially dry to the touch and may be shipped or stored as such for use, when desired, in the preparation of substantially non-aqueous, non-gelling zein solutions or coating compositions.

It is my belief that the compounding treatment of the zein in accordance with my invention effects a change in or modification of the zein molecule which enables the modified zein to be dissolved readily in alcoholic solvents to form solutions or coatings which are non-settling and substantially non-gelling over prolonged periods of time. It appears probable that the modification of the zein is the result of an inter-reaction or internal condensation between groups or radicals of the zein molecule, but whether this modification occurs in the zein immediately after treatment in accordance with my invention or in the formation of the solution in the alcoholic solvent, I am not prepared to state. However, the treatment does modify the zein molecule so that the polar characteristics thereof in alcoholic solvents are such that the resulting solutions or coatings exhibit substantially none of the gel forming and settling tendencies which are characteristic of alcoholic solutions or coatings formed from untreated commercial zein.

The zein used in accordance with my invention may be the commercial zein which contains a small percentage of moisture in the order of about 5 to 8% and is obtained in the trade in powdered form, or it may be a specially treated substantially anhydrous zein. In general, I find it desirable to produce a compounded zein product containing moisture in the order of about 8 to about 10% by weight. Thus, in the preferred practice of my invention, I first determine the moisture content of the zein to be used and calculate the quantity of added water necessary to supply with the additional ingredients to bring the product to the desired moisture content and incorporate this added water in either the acid or salt or both and treat the zein therewith. Of course, if the zein initially has a moisture content within the desired range, then this zein may be treated with the acid and/or salt in accordance with my invention without the need of added water, although, if desired, water may nevertheless be added to the treating materials to bring the moisture content of the zein up to any desired extent, which may on occasion even be in excess of about 10% by weight. In general, I prefer that the quantity of water so added be controlled so that the resulting solution in the aqueous or substantially non-aqueous alcoholic solvents be substantially non-aqueous, that is, with an added water content not in excess of about 5% by weight of the solution; however, this is not essential since solutions or coatings having in excess of 5% of added water in accordance with my invention also exhibit substantially no tendency to gel or settle over practical periods of time.

The acid used in accordance with my invention may be an inorganic acid such as hydrochloric or phosphoric acid or, preferably, boric acid or any mixture thereof. Acid salts (alcohol soluble) may also be employed to provide the desired acidic constituent. Other inorganic acids such as sulphuric, nitric and the like or their acid salts may also be used but these are not preferred. The reactive salt may be suitably magnesium chloride, calcium chloride, or bromide or fluoride, aluminum bromide or fluoride or like alcohol soluble salts or any mixture thereof. I prefer to use aluminum chloride or other reactive halide salts having characteristics in promoting condensation reactions similar to the aluminum chloride, such as zinc chloride, ferric chloride, stannic chloride, boron chloride, titanium chloride, antimony trichloride or mixtures thereof may also be used. While the zein may be treated with either an acid or a salt in accordance with my invention, in my preferred operations I treat the zein with a mixture of an acid and a salt, preferably, boric acid and aluminum chloride. The acid and/or reactive salt may be used in powder, crystal or liquid form depending, of course, on the form which is commercially available.

The quantity of acid or salt or mixture thereof which may be used in admixture with the zein in accordance with the present invention may vary rather widely although, in general, the amount of the acid or salt or mixture thereof should not be substantially in excess of about 20% by weight of the zein. For most purposes, from about 5 to about 15% is sufficient; however, best results are obtained when using from about 8 to about 12%. In instances where a mixture of acid and salt is used, a predominating proportion by weight of acid is desirable. A preferred mixture consists of about 66⅔% by weight of acid to about 33⅓% by weight of salt.

The present invention is illustrated by the following examples of compounded and modified zein bases embodying my invention; however, my invention is not to be construed as limited thereto since other suitable compositions in other suitable proportions are intended to be included within the scope of my claims. In the examples, the terms "part" and "parts" indicates part and parts by weight.

Example 1

| | Parts |
|---|---|
| Zein | 10.00 |
| Powdered boric acid | 0.80 |
| Aluminum chloride crystals (powdered) | 0.40 |

Example 2

| | Parts |
|---|---|
| Zein | 10.00 |
| Powdered boric acid | 0.85 |

Example 3

| | Parts |
|---|---|
| Zein | 10.00 |
| C. P. Hydrochloric acid | 1.00 |

Example 4

| | Parts |
|---|---|
| Zein | 10.00 |
| Aluminum chloride crystals (powdered) | 1.20 |

The zein compounded in accordance with my invention may be dissolved readily by 95% alcohol, other similar low-molecular weight alcohols, denatured alcohols or like solvents either free from water, or containing water. While the solvents for my compounded and modified zein base may contain any desired amount of water, I prefer, in general, that they contain only limited quantities of water so that the resulting solutions or coating compositions do not contain in excess of about 5% by weight of added water. I have found that in the production of solutions or coatings with my zein base that there first develops an initial viscous state which passes immediately into a thin, free flowing state of the consistency of a lacquer.

Due to the use of the compounded zein, the solutions or coatings so formed are stable against separation of the zein at normal room temperatures and even below and have a definitely delayed or retarded tendency to gel and, in some instances, are non-gelling over practical periods of time in the order of about 3 to 12 months and even longer with a wide range of concentrations of zein in the solvent or solvents, in the order of from about 2 to about 33⅓% by weight. These solutions or coatings exhibit substantially no tendency to settle even when diluted to about a 1 to 2% concentration of zein in the solvent or solvents. Heretofore, in the case of 95% alcohol, for example, as described and claimed in my prior copending application Serial No. 158,209, filed August 9, 1937, non-settling solutions were formed only when the concentration of zein therein varied from about 25 to 33⅓% by weight.

The compounded zein bases embodying my invention impart to the solutions or coatings prepared therefrom an extremely light, pale, straw color not heretofore attainable in zein coatings. Moreover, the solutions or coatings so prepared may be applied to any surface and they dry quickly and form films of greater toughness, flexibility, hardness and gloss than is capable of being formed from coating compositions prepared by dissolving zein not so treated. These solutions or coatings may be modified as desired as by the inclusion of diluents, modifiers, plasticizers, fillers and the like as set forth in my copending application Serial No. 219,827, filed July 18, 1938. Another advantage resulting from the use of my compounded and modified zein bases is that the coatings prepared therefrom form films, on drying, which do not exhibit the blushing tendencies characteristic of zein films formed from untreated zein. Perhaps the outstanding advantage flowing from the use of the compounded and modified zein embodying my invention is that zein solutions having all of the above advantages may be formed readily by dissolving the compounded and modified zein directly in the cheapest solvents such as the denatured alcohols. Heretofore, it has not been possible to dissolve zein in denatured alcohols and form solutions of the character hereinbefore described.

With compounded and modified zein bases embodying my invention, I have prepared zein coatings having the above desired characteristics by the aid of standard denatured alcohols such as, for example, a mixture of 100 parts by weight of 95% alcohol and 5 parts by weight of methyl alcohol, or a mixture consisting of approximately 89.3% of 95% alcohol, 4.4% methyl alcohol and 6.3% ethyl acetate, or like denatured alcohols.

While I have specifically referred herein to zein, other prolamins such as gliadin, hordein, kafirin and the like may be similarly treated.

In accordance with my invention I have also found that a modified zein having all of the characteristics set forth above may be produced by evaporating or otherwise removing the solvent and water from a solution of the compounded and modified zein as set forth above to form a dry or substantially dry modified zein which may be pulverized or powdered and sold as such for use in the preparation of substantially non-gelling, non-settling alcoholic solutions or coatings. In general, I prefer that this modified product contain a small percentage of moisture, in the order of about 8 to about 10% and hence in forming this product, the removal of the volatile constituents is carried out so that the residual modified product contains the desired percentage of moisture. The modified zein product has its polar characteristics so modified that a solution thereof in alcoholic solvents including methanol does not gel or settle over practical periods of time. Whereas a solution of 1 part by weight of normal untreated zein in 4 parts by weight of a solvent mixture containing ethyl alcohol, 10% of methyl alcohol and not over 5% of water will exhibit gel formation and settling tendencies within 72 hours at about 60° F., a similar solution of my modified zein does not gel or settle, or increase in viscosity under similar conditions.

I claim:

1. A substantially dry, non-plastic, non-sticky compounded zein base for use in the preparation of zein solutions or coating compositions comprising zein and an inorganic acid.

2. A substantially dry, non-plastic, non-sticky compounded zein base for use in the preparation of zein solutions or coating compositions comprising zein and an alcohol-soluble inorganic salt.

3. A substantially dry, non-plastic, non-sticky compounded zein base for use in the preparation of zein solutions or coating compositions comprising zein and an alcohol-soluble inorganic metal halide.

4. A substantially dry, non-plastic, non-sticky compounded zein base for use in the preparation of zein solutions or coating compositions comprising zein, an inorganic acid and an alcohol-soluble inorganic metal halide.

5. A substantially dry, non-plastic, non-sticky compounded zein base for use in the preparation of zein solutions or coating compositions comprising zein and boric acid.

6. A substantially dry, non-plastic, non-sticky compounded zein base for use in the preparation of zein solutions or coating compositions comprising zein and boric acid and aluminum chloride.

7. A substantially dry, non-plastic, non-sticky compounded zein base for use in the preparation of zein solutions or coating compositions comprising zein and aluminum chloride.

8. A substantially dry, non-plastic, non-ticky, treated zein having modified polar characteristics and characterized by the fact that a solution of 1 part by weight of the modified zein in 4 parts by weight of a solvent mixture containing ethyl alcohol, 10% of methyl alcohol and not over 5% of water will not settle, gel or increase in viscosity within 72 hours at 60° F.

ROY E. COLEMAN.